United States Patent [19]

Komoto et al.

[11] Patent Number: 5,295,250
[45] Date of Patent: Mar. 15, 1994

[54] MICROPROCESSOR HAVING BARREL SHIFTER AND DIRECT PATH FOR DIRECTLY REWRITING OUTPUT DATA OF BARREL SHIFTER TO ITS INPUT

[75] Inventors: Yasuhiko Komoto; Hiroaki Kaneko, both of Tokyo, Japan

[73] Assignee: NEC Corporation, Tokyo, Japan

[21] Appl. No.: 659,606

[22] Filed: Feb. 21, 1991

[30] Foreign Application Priority Data

Feb. 26, 1990 [JP] Japan ................... 2-46086

[51] Int. Cl.[5] .......................... G06F 7/00; G06F 9/22; G06F 9/40
[52] U.S. Cl. ....................... 395/375; 395/425; 364/262.7; 364/262.8; 364/947.6; 364/DIG. 2
[58] Field of Search .......... 395/375, 325, 250, 275, 395/425

[56] References Cited

U.S. PATENT DOCUMENTS

| | | | |
|---|---|---|---|
| 3,681,761 | 8/1972 | Schuenemann et al. | 395/275 |
| 4,418,383 | 11/1983 | Doyle et al. | 395/325 |
| 4,437,166 | 3/1984 | O'Brien | 395/250 |
| 4,814,976 | 3/1989 | Hansen et al. | 395/375 |
| 4,914,622 | 4/1990 | Sfarti et al. | 395/425 |
| 4,975,837 | 12/1990 | Woodward et al. | 395/375 |
| 4,977,497 | 12/1990 | Sakamura et al. | 395/375 |
| 5,034,879 | 7/1991 | Woodward et al. | 395/375 |
| 5,132,898 | 7/1992 | Sakamura | 395/425 |

FOREIGN PATENT DOCUMENTS 307166 5/1988 European Pat. Off. .
WO8800373 1/1988 World Int. Prop. O. .

OTHER PUBLICATIONS

IEEE Journal of Solid State Circuits, Oct. 1989, vol. 24, No. 5 A 20-MIPS Sustained 32-bit CMOS Microprocessor with High Ration of Sustained to Peak Performance pp. 1348-1359.

Manfred R. Schroeder et al. "Code-Excited Linear Prediction (CELP): High-Quality Speech at Very Low Bit Rates", 1985 IEEE, pp. 937-940.

*Primary Examiner*—Alyssa H. Bowler
*Assistant Examiner*—Meng-Ai T. An
*Attorney, Agent, or Firm*—Whitham & Marhoefer

[57] ABSTRACT

A microprocessor includes a barrel shifter, a rewrite section, and a control section. The barrel shifter serves as a shift unit which is controlled by a microprogram and operated by microinstructions for performing extraction, insertion, and comparison of consecutive bit strings in word data. The rewrite section directly rewrites output data from the barrel shifter into its input. The control section controls the rewrite section by using the microprogram.

3 Claims, 8 Drawing Sheets

| 1 | SFTOP = BIT ; | | ROR ; |
| 2 | SFTIN = DST ; | SFTOP = LEN ; | ROR ; |
| 3 | SFTI = SRC ; | SFTOP = BIT + LEN ; | ROL (SFTO) ; |
| 4 | | | ROL (SFTOI) ; |
| 5 | DST = SFTOUT ; | | END ; |

| 1 | SFTOP = COUNT ; | SFTOPR ; |
| 2 | SFTIN = SRC ; | |
| 3 | DST = SFTOUT ; | END ; |

SRC IS DATA TO BE SHIFTED

| | | | |
|---|---|---|---|
| 1 | SFTOP = BIT ; | | ROR ; |
| 2 | SFTIN = DST ; | | |
| 3 | SFTO = SFTOUT ; | SFTOP = LEN ; | ROR ; |
| 4 | SFTI = SRC ; | | ROL ; |
| 5 | SFTIN = SFTOUT ; | SFTOP = BIT + LEN ; | ROL ; |
| 6 | DST = SFTOUT ; | | END ; |

MICROPROCESSOR HAVING BARREL SHIFTER AND DIRECT PATH FOR DIRECTLY REWRITING OUTPUT DATA OF BARREL SHIFTER TO ITS INPUT

BACKGROUND OF THE INVENTION

The present invention relates to a microprocessor and, more particularly, to a technique for performing high-speed processing of instructions (to be referred to as bit field instructions hereinafter) to perform extraction, insertion, and comparison of consecutive bit strings (to be referred to as bit fields hereinafter) in word data.

A microprocessor has bit field operation instructions, as macro instructions, to perform extraction, insertion, and comparison of bit fields. In a conventional system, bit field operation instructions are executed by operating a barrel shifter using a microprogram. FIG. 4 shows a conventional barrel shifter. Referring to FIG. 4, reference numeral 101 denotes a data bus in a microprocessor; 102 and 103, registers (to be respectively referred to as an SFT0 and an SFT1 hereinafter) for holding input data; 104, a selector (to be referred to as a BSEL hereinafter) as a main body of the barrel shifter; 105, a register (to be referred to as an SFTOUT hereinafter) for holding output data from the barrel shifter; 106, a control section of the barrel shifter; 107, a microinstruction latch (to be referred to as an MI hereinafter) for storing microinstructions to operate the control section 106; 108, a register (to be referred to as an SFTOP hereinafter) for holding a shift amount to be supplied to the barrel shifter; 109, a register (to be referred to as an SFTOPR hereinafter) for holding various types of shift operations (e.g., "logic left shift", "logic right shift", "arithmetic left shift", "arithmetic right shift", "left rotate", and "right rotate"); 110, select information (to be referred to as an SFTSL hereinafter) to be generated for the BSEL 1-4 in accordance with values held in the SFTOP 108 and the SFTOPR 109; and 111 and 112, strobe signals (to be respectively referred to as an SFT0WR and an SFT1WR hereinafter) used to latch the value of the data bus 101 in the SFT0 102 and the SFT1 103.

When a shift operation is to be performed in the barrel shifter in FIG. 4, values are respectively set in the SFT0 102, the SFT1 103, the SFTOP 108, and the SFTOPR 109, and data is read out from the SFTOUT 105 at a predetermined timing by using a microprogram. FIG. 5 shows a microprogram used to perform a shift instruction in the barrel shifter in FIG. 4. Referring to FIG. 5, the following operations are performed in the respective steps:

First step: setting a shift amount COUNT in the SFTOP 108, and setting a shift type in the SFTOPR 109

Second step: setting data SRC (to be shifted) in the SFT0 102 and the SFT1 103

Third step: extracting a shift result from the SFTOUT 105, storing it in a destination DST, and terminating the microprogram Referring to FIG. 5, "SFTOPR" is a control instruction to set a value in the SETOPR 109 shown in FIG. 4. More specifically, "SFTOPR" includes: SHL . . . logic left shift; SHR . . . logic right shift; SAL . . . arithmetic left shift; SAR . . . arithmetic right shift; ROL . . . left rotate; and ROR . . . right rotate.

In addition, referring to FIG. 5, "END" represents the end of a microprogram, and "=" represents transfer of data to a register. In this case, "SFTIN" in the second step is a virtual register for indirectly designating the SFT0 102 and the SFT1 103. The value of the data SRC (to be shifted) is stored in the SFT0 102 and the SFT1 103 in accordance with the value of the SFTOPR 109, as shown in FIG. 7. Note that in the microprogram, values can be independently set in the SFT0 102 and the SFT1 103. In this case, "SFT0" and "SFT1" are to be described in the microprogram in place of "SFTIN".

FIG. 6 is a timing chart of the barrel shifter in the execution of the microprogram shown in FIG. 5. Signal names in FIG. 6 correspond to signal names in FIG. 4, although "CLOCK", "SFTUOP", and "SFTDIR" are not shown in FIG. 4. "CLOCK" indicates a clock. "SFTUOP" is the absolute value of "SFTOP". If the value of "SFTOP" is negative, it indicates a shift direction (left or right) opposite to a direction designated by "SFTOPR". "SFTDIR" indicates a final shift direction determined by the signs of "SFTOPR" and "SFTOP". In this conventional system, the positive/negative sign of "SFTOP" influences a shift direction. Otherwise, "SFTDIR" is directly determined by "SFTOPR", and "SFTUOP" and "SFTOP" are set to be the same value. However, such a difference is not an essential matter. Referring to FIG. 4, the BSEL 104 regards the SFT0 102 and the SFT1 103 as linked data of two words (e.g., 64 bits), extracts consecutive one-word data (e.g., 32 bits) from a specific bit position in the two-word data, and stores it in the SFTOUT 105. This one-word data is determined in accordance with the values of "SFTUOP" and "SFTDIR", as shown in FIG. 8.

Bit field operation instructions can be performed by the above-described barrel shifter. Three types of operations, i.e., "extract", "insert", and "compare", can be considered as bit field operations. In this case, insertion of a bit field will be considered as an example. Bit field insertion is an operation of inserting data of consecutive several bits (LEN bits) extracted from one-word data SRC in a range of consecutive LEN bits starting from a given bit position (bit BIT) of another one-word data DST. Assume, in this case, that lower LEN bit data is extracted from the data SRC to be inserted in the data DST. In this case, insertion of a bit field can be performed by the barrel shifter in accordance with a procedure shown in FIG. 9. FIG. 10 shows a microprogram which describes this procedure. FIG. 11 is a timing chart of the execution of the microprogram. Referring to FIG. 11, the value of "SFTOUT", which is changed three times, is read out in the minimum procedure. This is the minimum procedure for inserting a bit field. That is, the minimum procedure for bit field insertion using the conventional barrel shifter has 6 steps (6 clocks), as shown in FIG. 10.

As described above, bit field insertion using the conventional barrel requires at least 6 clocks. In practice, however, a microprogram is required to perform exception detection and the like as well as an operation of a barrel shifter. For this reason, it is difficult to perform bit field insertion using only 6 clocks. In addition, with recent applications to a postscript operation of a microprocessor and a laser printer, bit field operation instructions are required to be executed at higher speed. High-speed bit field operations cannot be performed by using the conventional barrel shifter.

SUMMARY OF THE INVENTION

It is an object of the present invention to provide a microprocessor which can perform high-speed bit field operations.

In order to achieve the object of the present invention, there is provided a microprocessor comprising a barrel shifter as a shift unit controlled by a microprogram and operated by microinstructions for performing extraction, insertion, and comparison of consecutive bit strings in word data, rewrite means for directly rewriting output data from the barrel shifter into an input thereof, and control means for controlling the rewrite means by using the microprogram.

DESCRIPTION OF THE PREFERRED EMBODIMENTS

The present invention will be described below with reference to the accompanying drawings.

Figures 1, 2:
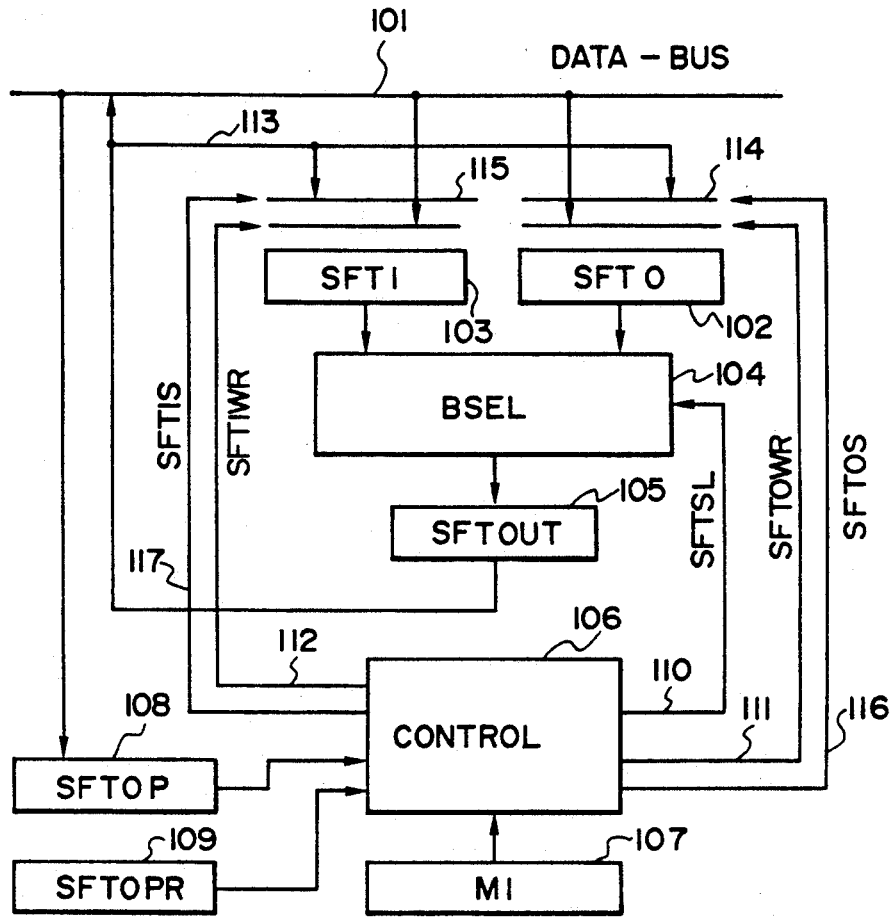
FIG. 1 is a block diagram showing a barrel shifter of a microprocessor according to the present invention.
FIG. 2 is a view showing a microprogram to execute insertion of a bit field by using the barrel shifter in FIG. 1.
Figures 4, 5:
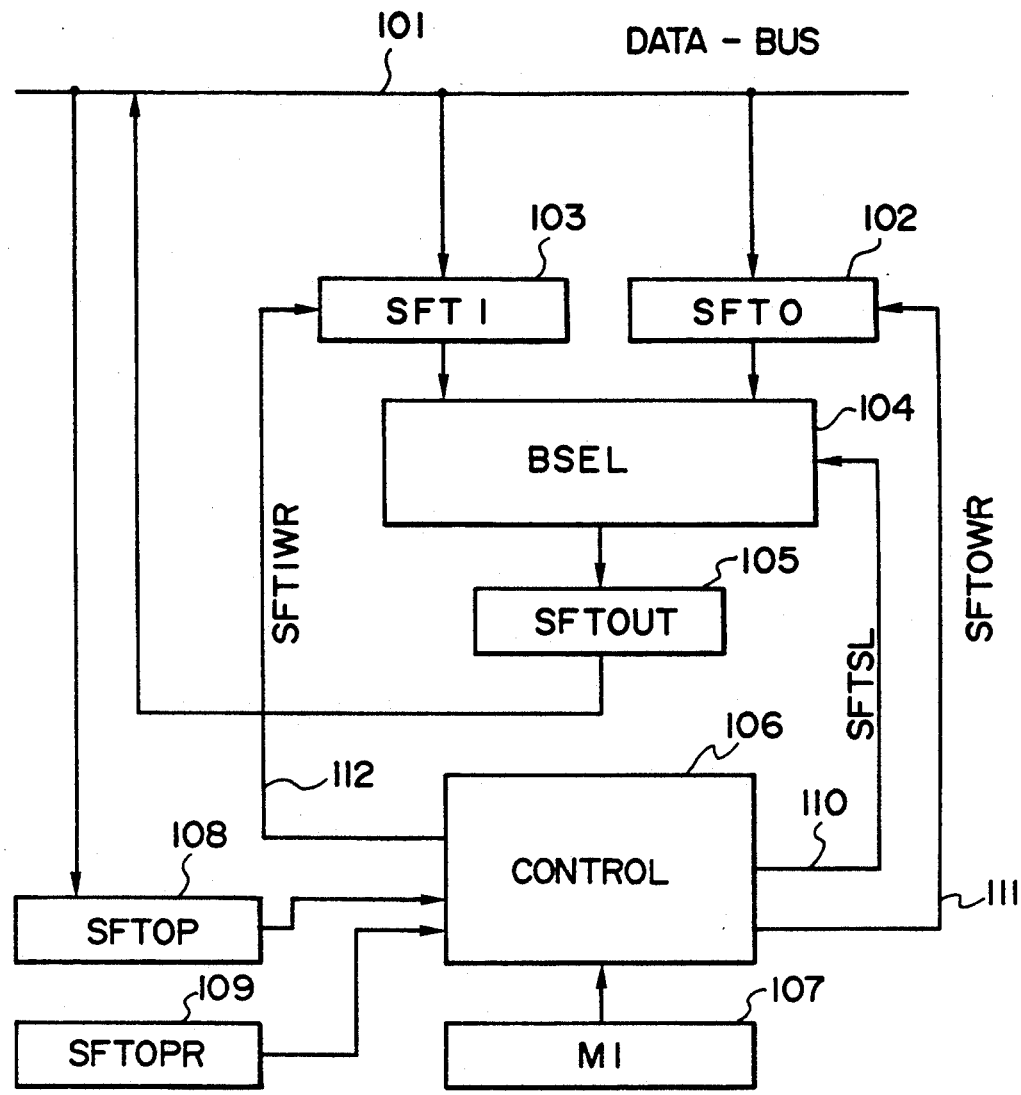
FIG. 4 is a block diagram showing a barrel shifter of a conventional microprocessor.
FIG. 5 is a view showing a microprogram to execute a shift operation by using the barrel shifter in FIG. 4.
Figure 6:
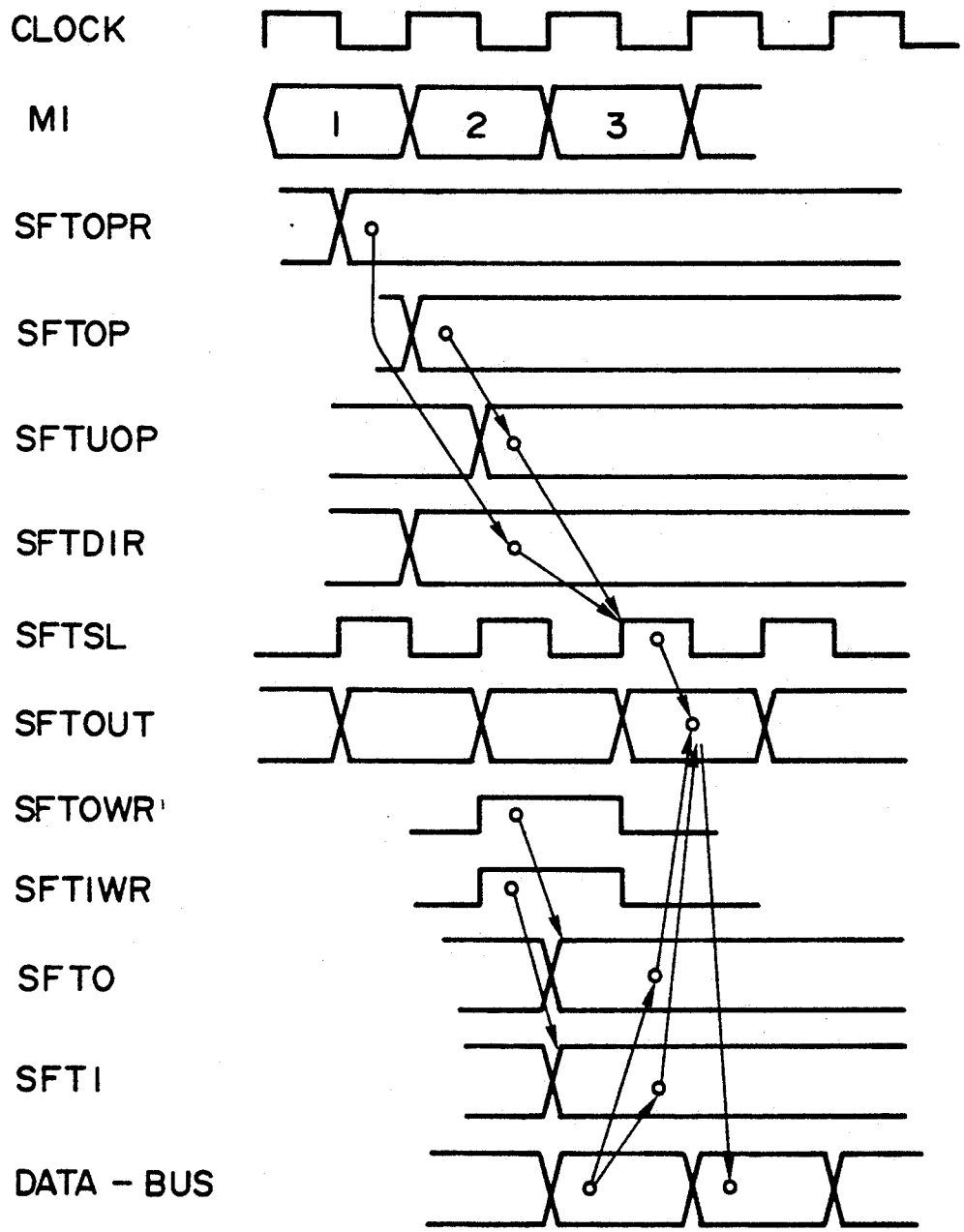
FIG. 6 is a timing chart of an operation of the barrel shifter shown in FIG. 4 in the execution of the microprogram in FIG. 5.
Figure 7A:
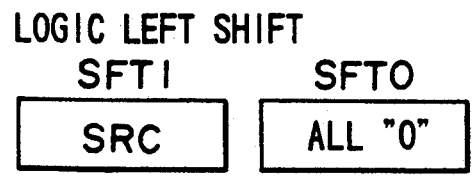
FIGS. 7A, 7B, 7C, 7D, 7E and 7F are views for explaining values to be set in "SFT0" and "SFT1" when a shift operation is performed by using the barrel shifter in FIG. 4.
Figure 7B:
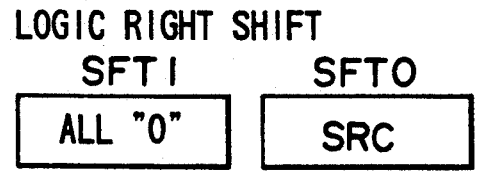
Figure 7C:
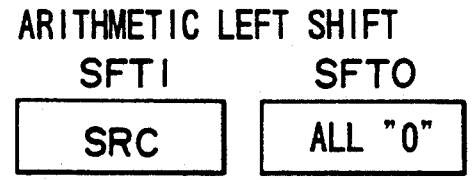
Figure 7D:
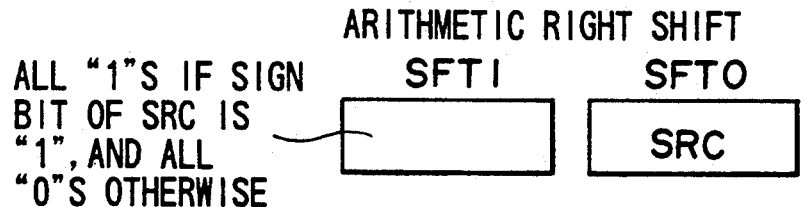
Figure 7E:
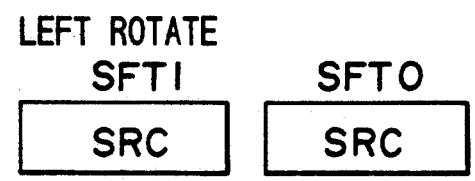
Figure 7F:
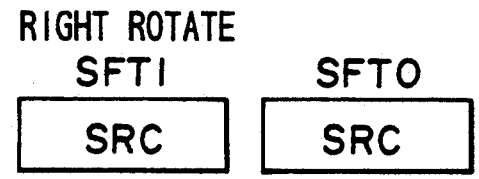
Figure 8A:
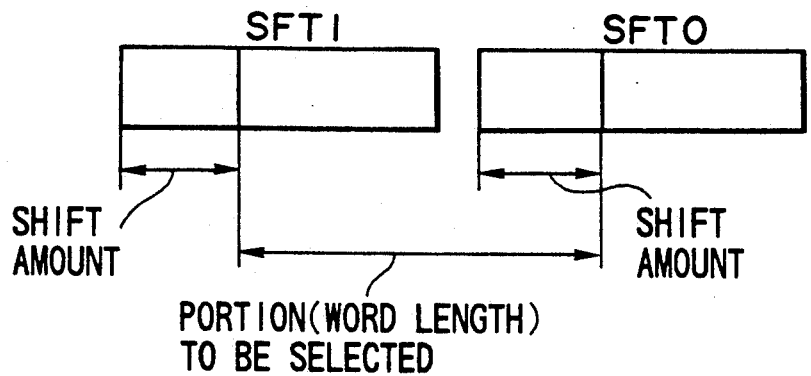
FIGS. 8(a) and 8(b) are views for explaining positions where data, as outputs from the barrel shifter in FIG. 4, are respectively extracted from the inputs SFT0 and SFT1.
Figure 8B:
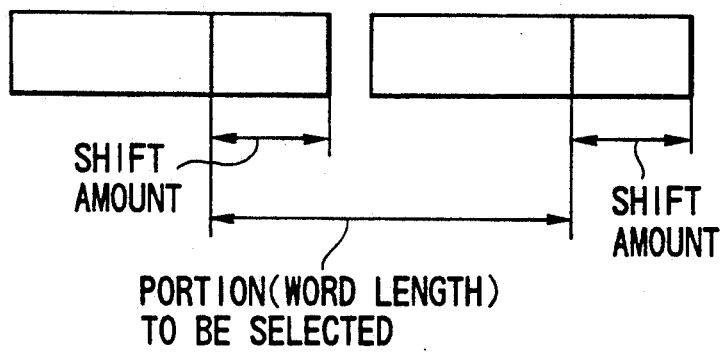

FIG. 1 shows a barrel shifter according to an embodiment of the present invention. Reference numerals 101 to 112 in FIG. 1 denote the same parts as those of the conventional barrel shifter in FIG. 4. In addition to the components of the conventional barrel shifter shown in FIG. 4, the arrangement shown in FIG. 1 includes: a rewrite path 113 extending from an output SFTOUT 105 of the barrel shifter to inputs SFT0 102 and SFT1 103; multiplexers 114 and 115; and strobe signals SFT0S 116 and SFT1S 117 to latch the value of the SFTOUT 105 into the input SFT0 102 or the SFT1 103 through the rewrite path 113. The multiplexer 114 selects data to be latched in the SFT0 102 from a data bus 101 or the rewrite path 113 in accordance with a strobe signal SFT0WR 111 and the strobe signal SFT0S 116. Similarly, the multiplexer 115 selects data to be latched in the SFT1 103 from the data bus 101 and the rewrite path 113 in accordance with a strobe signal SFT1WR 112 and the strobe signal SFT1S 117. Note that although it is not particularly described in the prior art, the strobe signal SFT0WR 111 is generated when the following condition is designated in the microprogram:

SFTIN= ...

or

SFT0= ...

and the strobe signal SFT1WR 112 is generated when the following condition is designated in the microprogram:

SFTIN= ...

or

SFT1= ...

Figure 3:
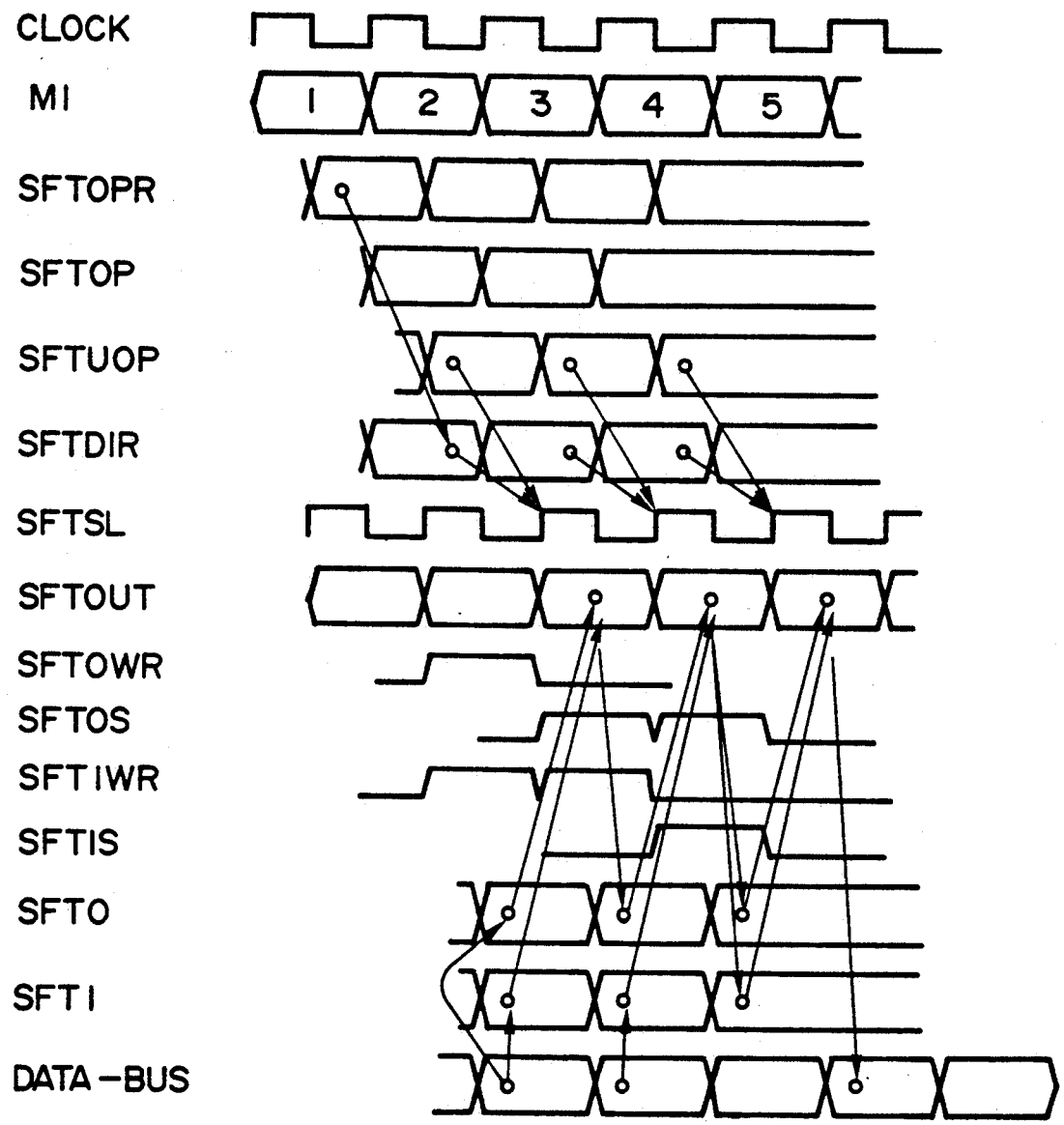
FIG. 3 is a timing chart of an operation of the barrel shifter shown in FIG. 1 in the execution of the microprogram in FIG. 2.
Figures 9, 10:
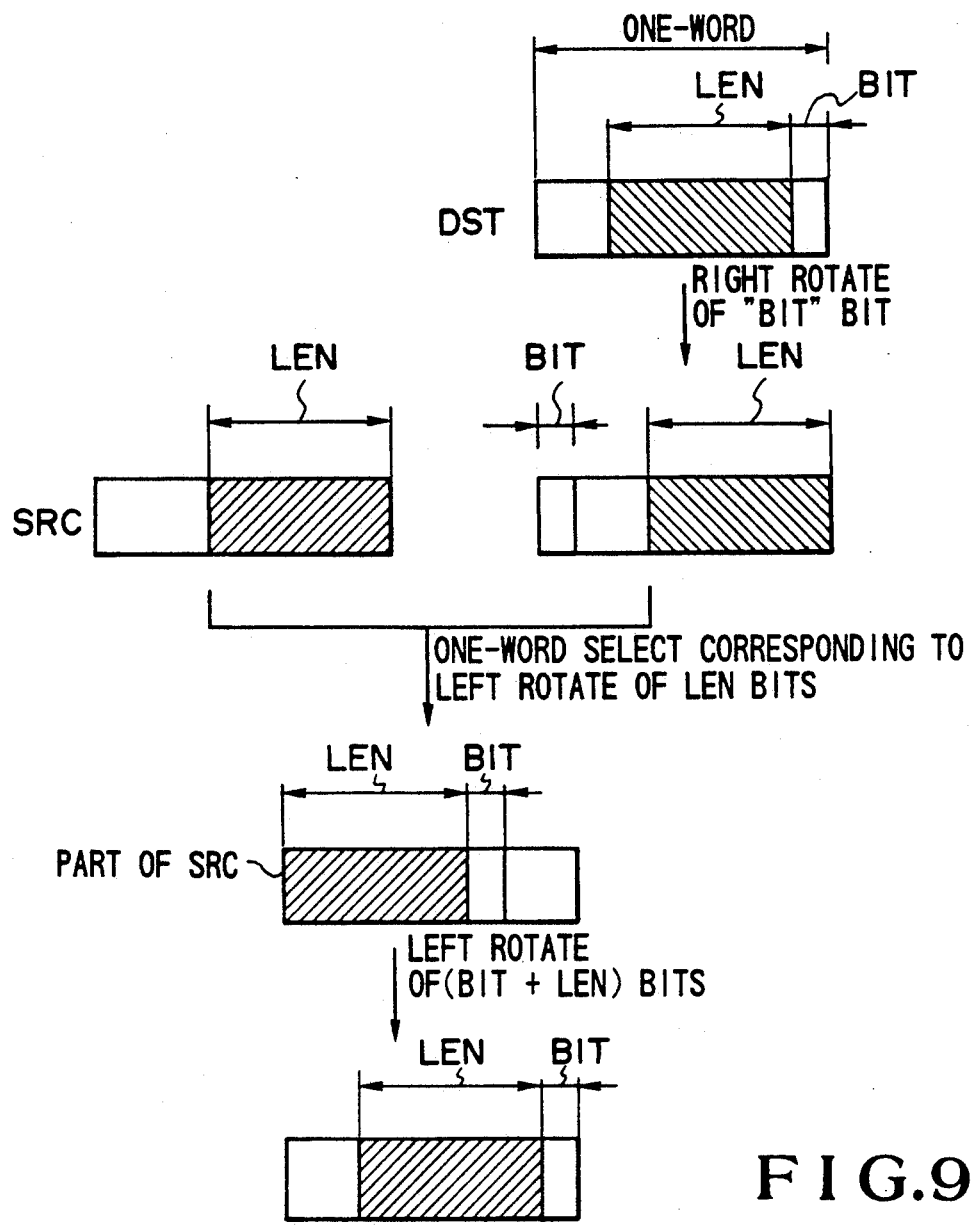
FIG. 9 is a view showing a procedure for executing bit field insertion by using the barrel shifter.
FIG. 10 is a view showing a microprogram for executing the procedure shown in FIG. 9 by using the conventional barrel shifter.
Figure 11:
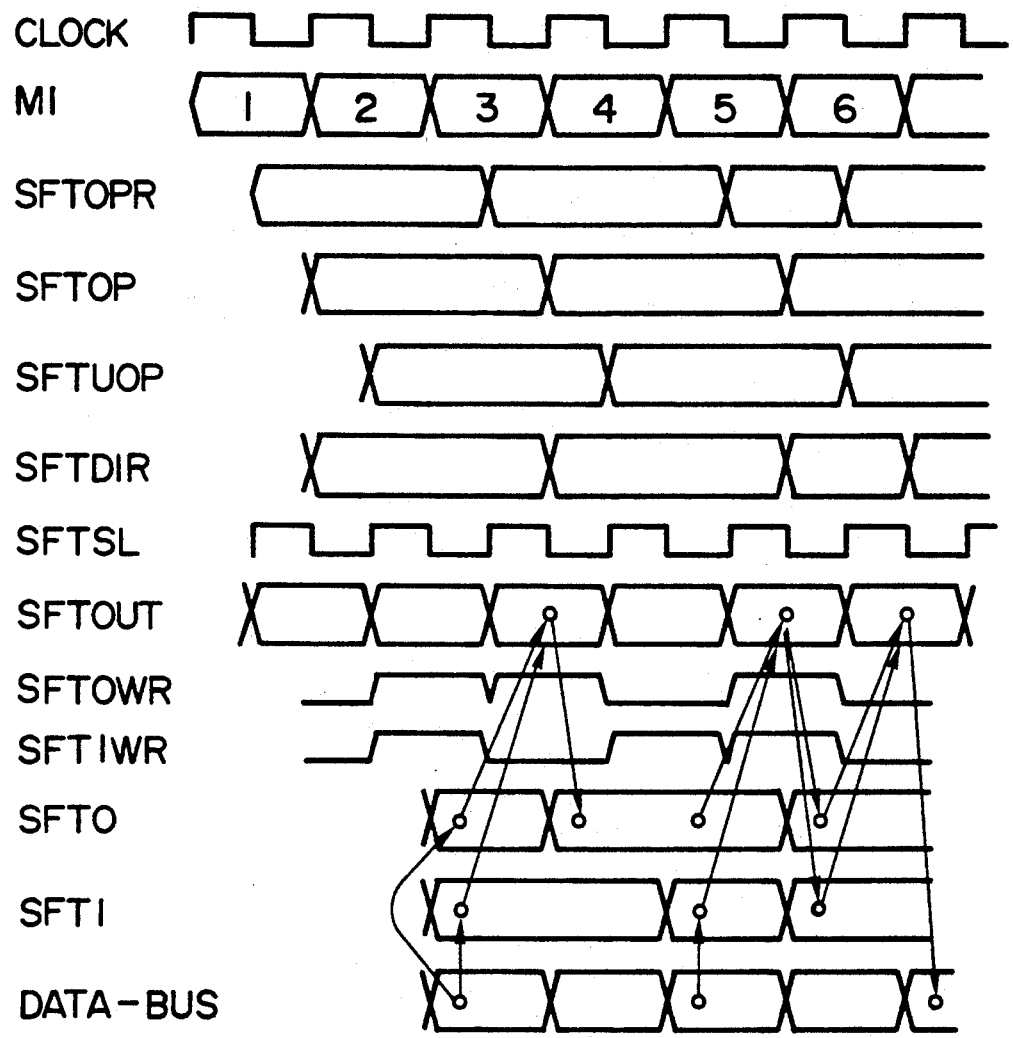
FIG. 11 is a timing chart of an operation of the barrel shifter shown in FIG. 4 in the execution of the microprogram in FIG. 10.

The strobe signals SFT0S 116 and SFT1S 117 are generated when a rewrite operation with respect to the SFT0 102 or the SFT1 103 through the rewrite path is designated in the microprogram. Various methods of designating a rewrite operation are available. In this case, a rewrite operation is designated at the same time as a shift type SFTOPR is designated. In this method, for example, a microinstruction SFTOPR (SFT0) designates a rewrite operation with respect to the SFT0 102 at the same time as the type of shift is changed, and a microinstruction SFTOPR (SFT1) designates a rewrite operation with respect to the SFT1 103 at the same time as the type of shift is changed. A microinstruction SFTOPR (SFT01) is used to designate simultaneous rewrite operations with respect to the SFT0 102 and the SFT1 103 at the same time as the type of shift is changed. In this case, a microprogram for performing bit field insertion shown in FIG. 10 can be rewritten, as shown in FIG. 2. FIG. 3 shows a timing chart in the execution of the microprogram shown in FIG. 2. Referring to FIG. 3, when a shift type and a rewrite operation are to be simultaneously designated, a shift result SFTOUT is influenced by a change in the shift type SFTOPR two clocks after the change. The SFTOUT is rewritten in the SFT0 or the SFT1 by rewrite designation 0.5 clocks after the change, and the SFTOUT is updated by the rewritten SFT0 or SFT1 0.5 clocks after the rewrite operation. Therefore, the description of the microprogram becomes complicated. However, bit field insertion can be performed within 5 clocks. As indicated by the timing chart in FIG. 3, according to this embodiment, insertion of a bit field can be performed without wasting even one clock.

The second embodiment of the present invention will be described below. The first embodiment employs the method of designating a rewrite operation of output data from the barrel shifter into its input at the same time as the shift type is changed. However, a rewrite operation may be designated by transfer of data to a virtual register as in the case of data transfer to the virtual register SFTIN in a microinstruction. For example, the microprogram description "SFT0 (SFT1)= ..." can be used to both transfer a given value to "SFT0" and rewrite the value of "SFTOUT" into "SFT1". Similarly, "SFT1 (SFT0)= ..." may be used to both transfer a given value to "SFT1" and rewrite the value of "SFTOUT" into the "SFT0".

As has been described above, according to the present invention, a rewrite path is additionally arranged in a conventional barrel shifter to rewrite output data therefrom into its input. With this arrangement, a bit field operation instruction can be performed by most efficiently using the barrel shifter with a minimum number of steps.

What is claimed is:

1. A microprocessor comprising:
   a first register for holding data input thereto, said first register is constituted by a pair of registers;
   a selector for selecting a portion of the data held in said first register;
   a second register for holding output data from said selector;
   a third register for holding a shift amount to be supplied to said selector;
   a fourth register for holding a type of shift operation in said selector;
   a multiplexer for switching the data input to said first register between input data from a data bus and the data held in said second register, and supplying the switched data to said first register; and
   control means for controlling an operation of said selector in accordance with the shift amount and the type of shift respectively held in said third and fourth registers and controlling a switching operation of said multiplexer while designating a shift type with respect to said selector, said control means includes means for independently controlling rewrite operations of said pair of registers of said first register by directly rewriting output data from said second register into input of said first register.

2. A microprocessor according to claim 1, wherein said control means include means for simultaneously designating a type of shift and a rewrite operation.

3. A microprocessor according to claim 1, wherein said control means includes means for designating a rewrite operation by transferring data to a virtual register.

* * * * *